April 21, 1953 C. F. BIVENS 2,635,239
EYE PROTECTOR AND GLARE SHIELD
Filed Dec. 6, 1950 2 SHEETS—SHEET 1

INVENTOR.
CARL F. BIVENS
BY
Anderson & Muller
ATTORNEYS

April 21, 1953     C. F. BIVENS     2,635,239
EYE PROTECTOR AND GLARE SHIELD

Filed Dec. 6, 1950     2 SHEETS—SHEET 2

INVENTOR.
CARL F. BIVENS
BY
Anderson & Miller
ATTORNEYS

Patented Apr. 21, 1953

2,635,239

UNITED STATES PATENT OFFICE 2,635,239

EYE PROTECTOR AND GLARE SHIELD

Carl F. Bivens, Denver, Colo.

Application December 6, 1950, Serial No. 199,471

7 Claims. (Cl. 2—12)

This invention relates to improvements in eye protectors and glare shields.

It is the object of this invention to produce an eye protector and glare shield of general utility, which shall be of such construction and design that it may be employed as a glare shield for protecting the eyes from the harmful effect of strong unpolarized sunlight, from the harmful effects of ultra violet light from welding arcs, etc., and which will also serve to protect the eyes from flying particles of solid matter such as metal chips released during machining operations and chipping with chisels.

In machine shops, welding establishments and foundries, there is an everpresent danger of eye injury due to flying particles of solid matter. Where electric and/or oxyacetylene welding is practiced, much ultra violet light is produced which, as is well known, is highly injurious to the eyes, necessitating glare shields to be worn. Strong sunlight is also injurious and must be guarded against by suitable shields.

The invention that forms the subject of this application and which will presently be described in detail is so designed that it can be worn with comfort and can be adjusted to give the desired protection.

Sunlight reflected from smooth surfaces becomes polarized, and it is an object of this invention to produce a glare shield which will modify the polarized light to such an extent that it will become harmless.

The above, and any other objects to which attention may be called or which may become apparent as the description proceeds, are attained by means of a construction and an arrangement of parts that will now be described in detail, for which purpose reference will be had to the accompanying drawings in which the invention has been illustrated and in which.

Figure 2:
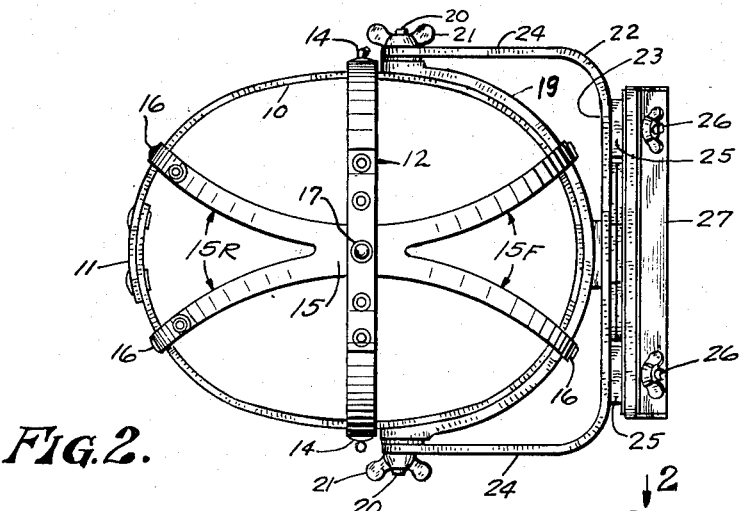
Figure 2 is a top plan view to a somewhat enlarged scale, with the fabric covering removed, looking in the direction of arrow 2, Figure 1.

Referring now to the drawing, reference numeral 10 designates an endless leather band of the proper length to encircle the wearer's head. The length of the head band may be adjusted to fit the wearer's head, for which purpose one or more joints like that indicated by reference numeral 11 in Figure 2 may be provided. A strap 12 extends over and across the head of the wearer, and is attached near its ends to head band 10 by rivets 13, or similar means, and carries one or more male snap fasteners 14. Another strap, 15, extends longitudinally of the area enclosed by the head band and has its ends split, forming two diverging portions, 15F and 15R, which are attached to the head band by rivets 16. Strap 12 is attached to strap 15 at point 17 where the two cross. A cloth cap 18 encloses or covers straps 12 and 15, and is removably attached by snap fasteners or equivalent means. A reinforcing strap or band 19 extends about the front half of band 10, and is formed from stiffer material than band 10, preferably from some suitable plastic. Short bolts 20 extend outwardly from bands 10 and 19, and are provided with wing nuts 21. A U-shaped bail 22 has a substantially straight base 23, and parallel legs 24, whose ends are pivoted to bolts 20. Two trapezoidal blocks 25 are attached to base 23 and are provided with bolts 26 by means of which the polarizing glare shield 27 is attached to the bail. Shield 27 has slots 28 through which bolts 26 extend, which permits the shield to be adjusted transversely.

For persons who must wear corrective spectacles or lenses, a frame 29 has been provided which is removably attached to base 23 by bolts 30. The frame is of a shape substantially as shown and carries two lenses 31 ground to fit the wearer's eyes. In cases where no corrective lenses are needed, suitable shatterproof lenses are used for protection against injury from flying particles.

Where the device is to be used as a protector against X-rays, red acetate plastic may be employed. It is to be understood, however, that the material for the lenses and any of the other parts of the device is to be selected with regard to the function to be performed, and the materials mentioned in the above description are not to be construed as in any way limiting the invention thereto.

Figure 10:
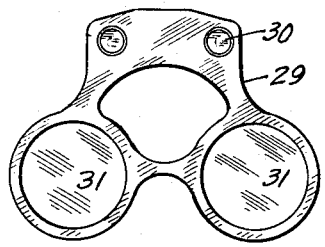
Figure 10 is a view taken on line 10—10, Figure 8, and shows a detachable spectacle frame.
Figure 1:
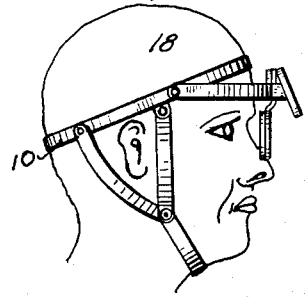
Figure 1 is a side elevational view, showing the invention in operative position.
Figure 3:
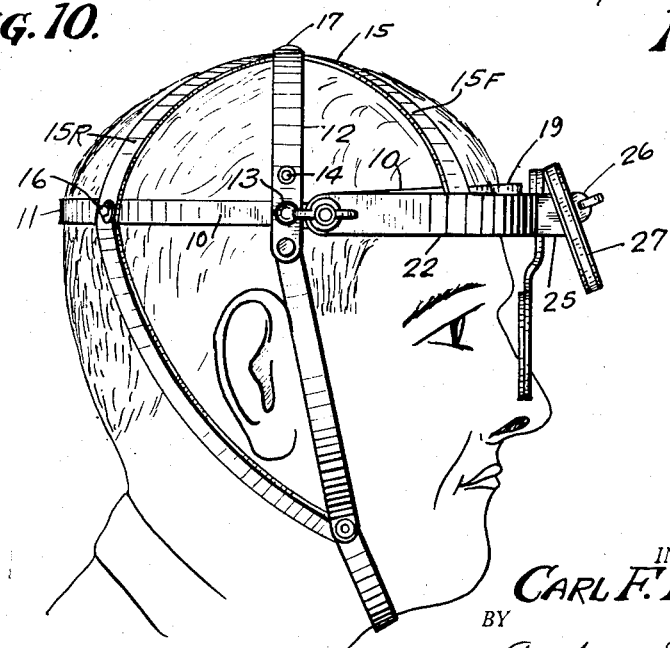
Figure 3 is a side elevational view looking upwardly in Figure 2.
Figure 4:
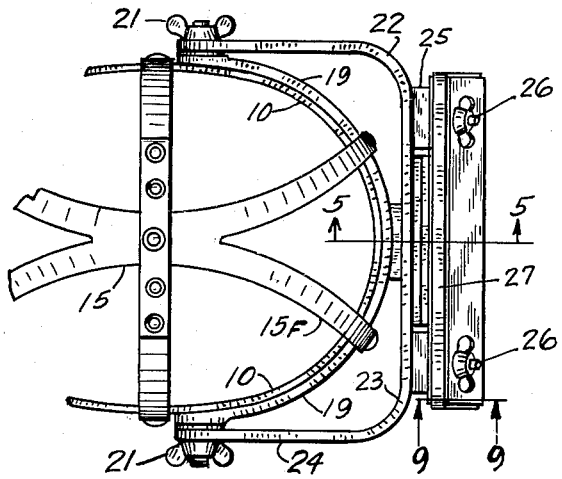
Figure 4 is a fragmentary top plan view showing the parts to a somewhat larger scale.

The glare shield 27 illustrated on the drawing and shown in section in Figure 10 has been developed and constructed in such a manner that it will give maximum protection from strong sunlight either direct or reflected and which, in addition, will also give protection from rays developed during welding, either by electric arc or oxygen acetylene gas flame.

Figure 8:
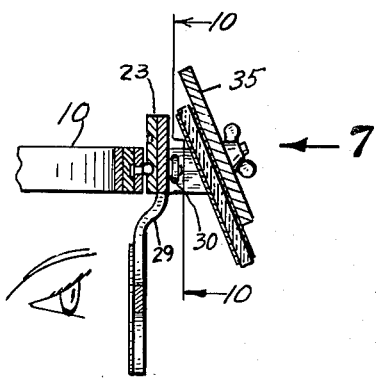
Figure 8 is a section taken on line 8—8, Figure 7.
Figure 5:
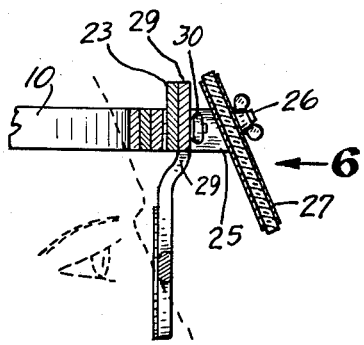
Figure 5 is a section taken on line 5—5, Figures 4 and 6.
Figure 6:
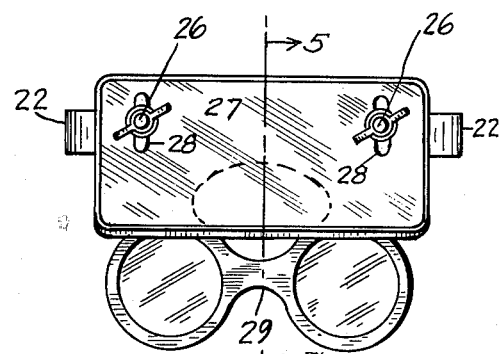
Figure 6 is a front elevational view looking in the direction of arrow 6 in Figure 5.
Figure 7:
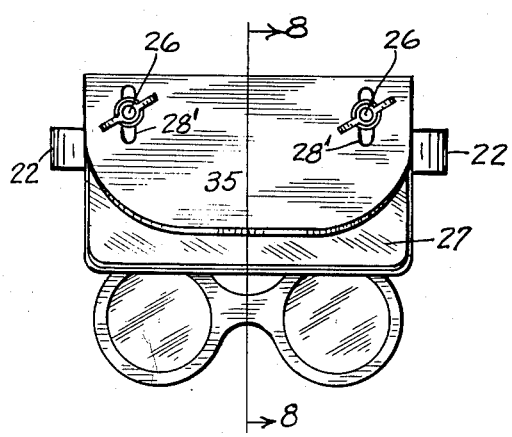
Figure 7 is a view similar to that shown in Figure 6, showing a modification.
Figure 9:
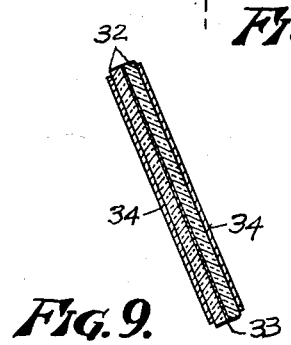
Figure 9 is a section taken on line 9—9, Figure 4.

In Figure 9, a cross section of a glare shield of the preferred construction has been shown which may be substituted for the one shown in section in Figure 5. The two parts designated by reference numeral 32 consist of pieces of transparent glass that are separated by a layer 33 of transparent cementious material such as collodion or Canadian balsam; the outer surfaces of the assembly are covered with thin plastic sheets 34. The nature of the plastic may vary depending on the particular function to be performed by it.

Where the wearer requires protection from strong sunlight or other objectionable radiation from an elevated source, shield 27 may be partially covered with an opaque member 35 shown in Figures 7 and 8, which has slots 28' through which bolts 26 extend. By means of slots 28' member 35 may be adjusted to cover more or less of the upper surface of shield 27. Bail 22 is pivoted on bolts 20 as above explained, and can therefore be adjusted angularly and clamped in adjusted position by nuts 21. When the shield is not needed, it can be moved upwardly to any angular extent and may be adjusted so as to obtain the position that gives the greatest comfort to the wearer and the best results.

Visor 27 has no prism and protects vision by virtue of its thickness. It reflects light from its plane upper surface and deflects the light and prevents harmful rays from reaching the pupils and, at the same time, does not rob the eyes of the light necessary for proper vision.

The invention, as above pointed out, is of general utility and the material employed in the glare shield is selected from those whose physical characteristics adapt them for performing the desired functions. Certain kinds of colored glass and plastics give protection from violet rays, others from X-rays, and other more particularly from the sun's rays, etc.

Having described the invention, what is claimed as new is:

1. An eye protector and glare shield, comprising in combination, an endless head band, means engaging the top of the head for limiting the downward movement of the band, comprising at least one strap attached at its ends to opposite parts of the band, a substantially U-shaped bail positioned with the rear surface of the base closely adjacent the front outer surface of the band, the two legs extending rearwardly along the sides of the band, means effecting a pivotal connection between the rear ends of the legs and the band whereby the bail may be tilted relative to the plane of the band, means latching the bail relative to the band in several positions, two spacer blocks attached to the front surface of the base of the bail in positions equally spaced from the center of the base, the front surfaces of the blocks being downwardly and forwardly inclined, a glare shield attached to the inclined surfaces, and an optical lens carrying frame attached to the base, between the spacer blocks, said frame having lenses positioned in the line of vision of the wearer.

2. A device in accordance with claim 1 in which the head band and support strap are covered with cloth, shaped to conform to the shape of the wearer's head.

3. An eye protector and glare shield having a head band, a bail of substantially U-shape positioned with the legs of the U embracing the front of the band, the ends of the legs being pivotally connected with the head band to permit adjustment relative to the plane thereof, means for clamping the bail in adjusted position relative to the head band, a glare shield attached to the front side of the base of the bail, said attaching means comprising two bolts attached to the base of the bail, projecting forwardly therefrom, the glare shield having two openings spaced to receive the bolts, whereby it may be clamped in position by means of nuts applied to the bolts, and a spectacle frame attached to the bail between the bolts.

4. A device in accordance with claim 3 in which an opaque planar member is positioned on the outside of the glare shield, said planar member having transverse slots for reception of the shield attaching bolts, whereby the opaque member may be adjusted relative to the glare shield.

5. An eye protector and glare shield, comprising a bail having a pair of leg portions and a bight portion therebetween, means comprising an endless band for securing the bail to the head of a user in a position such that it extends around the user's forehead, and an elongated flat glare shield of relatively thin transparent material disposed in front of the bight portion, means securing the glare shield to the bight portion in an inclined plane extending forwardly and downwardly from the user's normal horizontal line of vision, the lower edge of the glare shield being normally disposed above said horizontal line of vision whereby the latter is unobstructed, and an opaque sheet of material overlying at least a portion of the transparent sheet on one face of the latter.

6. An eye protector and glare shield, comprising a bail having a pair of leg portions and a bight portion therebetween, means comprising an endless band for securing the bail to the head of a user in a position such that it extends around the user's forehead, and an elongated flat glare shield of relatively thin transparent material disposed in front of the bight portion, means securing the glare shield to the bight portion in an inclined plane extending forwardly and downwardly from the user's normal horizontal line of vision, the lower edge of the glare shield being normally disposed above said horizontal line of vision whereby the latter is unobstructed, a spectacle frame, and means for securing it to the bail in a position depending from the latter.

7. An eye protector and glare shield, comprising a bail having a pair of leg portions and a bight portion therebetween, means comprising an endless band for securing the bail to the head of a user in a position such that it extends around the user's forehead and an elongated flat glare shield of relatively thin transparent material disposed in front of the bight portion, means securing the glare shield to the bight portion in an inclined plane extending forwardly and downwardly from the user's normal horizontal line of vision, the lower edge of the glare shield being normally disposed above said horizontal line of vision whereby the latter is unobstructed, said glare shield comprising a sheet of transparent glass having a transparent plastic sheet of material attached to one face thereof.

CARL F. BIVENS.

References Cited in the file of this patent

UNITED STATES PATENTS

| Number | Name | Date |
|---|---|---|
| 865,484 | Ellis | Sept. 10, 1907 |
| 1,247,853 | McWenie | Nov. 27, 1917 |
| 1,435,533 | Knackstedt | Nov. 14, 1922 |
| 2,354,415 | Woodard | July 25, 1944 |

FOREIGN PATENTS

| Number | Country | Date |
|---|---|---|
| 305,780 | Germany | May 21, 1918 |